(12) United States Patent
Haderer

(10) Patent No.: US 6,822,558 B1
(45) Date of Patent: Nov. 23, 2004

(54) ANTI-THEFT DEVICE FOR MOTOR VEHICLE EQUIPMENT

(75) Inventor: Guenter Haderer, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 544 days.

(21) Appl. No.: 09/463,109

(22) PCT Filed: Jun. 17, 1998

(86) PCT No.: PCT/DE98/01647

§ 371 (c)(1),
(2), (4) Date: Jun. 18, 2000

(87) PCT Pub. No.: WO99/03708

PCT Pub. Date: Jan. 28, 1999

(30) Foreign Application Priority Data

Jul. 18, 1997 (DE) .......................................... 197 30 793

(51) Int. Cl.[7] .............................................. B60R 25/10
(52) U.S. Cl. ............................... 340/426.1; 340/426.11; 307/9.1; 307/10.2
(58) Field of Search ............................. 340/426.1, 438, 340/825.06, 5.1, 5.31, 545.6, 693, 426.11; 307/9.1, 10.1, 10.2, 10.3, 10.4, 10.5, 10.6; 116/33, 45; 455/345, 346, 347, 348

(56) References Cited

U.S. PATENT DOCUMENTS

| | | | | |
|---|---|---|---|---|
| 4,248,069 A | * | 2/1981 | Burbank | 70/160 |
| 4,960,623 A | * | 10/1990 | Levinson | 428/31 |
| 5,068,765 A | * | 11/1991 | Nimpoeno | 361/422 |
| 5,142,701 A | * | 8/1992 | Buckley | 455/345 |
| 5,184,489 A | * | 2/1993 | Squires et al. | 70/58 |
| 5,255,965 A | * | 10/1993 | Chen et al. | 312/7.1 |
| 5,506,563 A | * | 4/1996 | Jonic | 340/426 |
| 5,524,859 A | * | 6/1996 | Squires et al. | 248/551 |
| 5,705,976 A | * | 1/1998 | Howard | 340/426 |
| 5,726,868 A | * | 3/1998 | Koyama et al. | 361/832 |
| 5,831,344 A | * | 11/1998 | Rose, Sr. | 307/10.3 |
| 5,923,624 A | * | 7/1999 | Groeger et al. | 369/7 |
| 6,127,923 A | * | 10/2000 | Howard | 340/426 |
| 6,127,947 A | * | 10/2000 | Uchida et al. | 340/999 |
| 6,140,935 A | * | 10/2000 | Hayton et al. | 340/825.31 |

\* cited by examiner

Primary Examiner—Toan N. Pham
(74) Attorney, Agent, or Firm—Kenyon & Kenyon

(57) ABSTRACT

An arrangement for theft protection of a motor vehicle accessory, in particular of a car radio, having a codable theft protection device. An enclosing device that can be activated or deactivated via an immobilizer of a control system of a drive mechanism of a motor vehicle is provided.

16 Claims, 1 Drawing Sheet

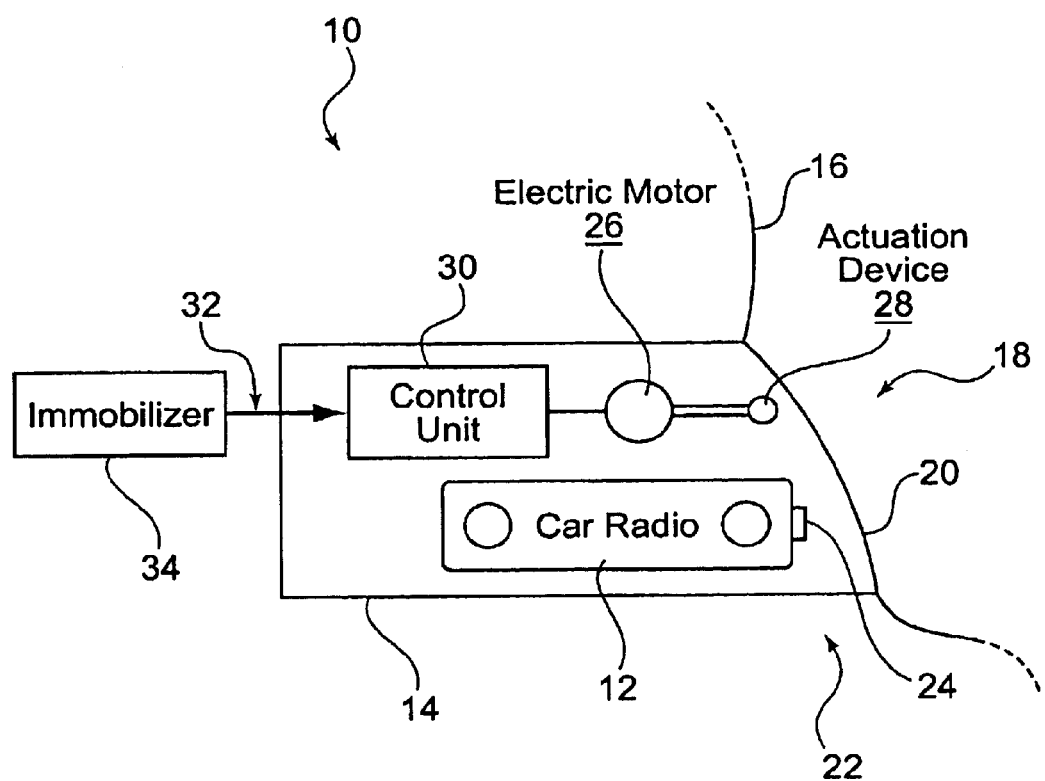

ANTI-THEFT DEVICE FOR MOTOR VEHICLE EQUIPMENT

FIELD OF THE INVENTION

The present invention relates to an arrangement for theft protection of a motor vehicle accessory, in particular of a car radio, having a codable theft protection device.

BACKGROUND INFORMATION

In the context of motor vehicles, numerous methods are known for protecting car radios from theft. For example, the car radios can possess removable control panels that can be taken along when leaving the motor vehicle. Also known are coding capabilities such that an electronic coding of the car radio must be performed when it is present in the motor vehicle. The car radio can be put back into service only after recoding, and for that purpose the corresponding code must be known. Also known are covering devices with which the car radio can be shielded from view.

So-called drive locks, in which important electronic subassemblies of the internal combustion engine of the motor vehicle can be disabled via an immobilizer, are known for the protection of motor vehicles. The motor vehicle cannot be started until the immobilizer has been deactivated. Activation or deactivation of the immobilizer is performed, for example, via an ignition key of the motor vehicle that contains a coded transponder, so that the immobilizer can be deactivated only via that transponder.

SUMMARY OF THE INVENTION

The arrangement according to the present invention for theft protection of a motor vehicle accessory, offers the advantage of providing, in simple fashion, comprehensive theft protection for the motor vehicle accessory. By the fact that an enclosing device of the arrangement for theft protection can be activated or deactivated via an immobilizer of a control system of a drive mechanism of a motor vehicle, it is possible to implement automatic theft protection that acts independently of manual interventions of a vehicle driver. Thus on the one hand, improper operations impairing the effectiveness of a theft protection system are ruled out, and on the other hand it is no longer necessary to retain, in secure fashion, a code for theft protection of the motor vehicle accessory.

In a preferred embodiment of the present invention, provision is made for the enclosing device to be a housing, receiving the motor vehicle accessory, that has at least one closure device that can be actuated via the immobilizer, the closure device preferably being actuable via an electric motor that can be activated by way of the immobilizer. The advantageous result of this is that deactivation of the immobilizer, for example by inserting an ignition key into an ignition lock of the motor vehicle, automatically deactivates the enclosing device by the fact that the closure device automatically opens and the motor vehicle accessory, in particular control elements of a car radio, becomes accessible.

BRIEF DESCRIPTION OF THE DRAWINGS

The FIGURE shows the arrangement for theft protection of a motor vehicle accessory.

DETAILED DESCRIPTION

The FIGURE shows, in a schematic side view, an arrangement 10 for theft protection of a car radio 12. The present invention is, of course, not limited to theft protection for a car radio 12, but can also be used for any other desired motor vehicle accessory for which theft protection is to be provided. These include, for example, high-value navigation devices, radio sets, audio systems in general, for example with cassette or CD player, etc.

Arrangement 10 comprises a housing 14 that is recessed into a dashboard 16 of a motor vehicle. Housing 14 is immovably joined to body parts of the motor vehicle, so that it cannot be taken out of dashboard 16. Optionally, housing 14 can comprise only individual struts that constitute an installation space for car radio 12. In this case housing 14 is not configured as a closed housing 14. Housing 14 can be enclosed by way of a closure device 18 that, in the example shown, is configured as front panel 20. Front panel 20 is recessed flush into dashboard 16. Housing 14 with closure device 18 thus forms an enclosing device 22 for car radio 12. Car radio 12 is advantageously arranged in housing 14 in such a way that when front panel 20 is open, control elements 24 of car radio 12 are accessible.

Associated with front panel 20 is an electric motor 26 that constitutes an actuation device 28 for front panel 20. For this purpose, actuation device 28 can be coupled in suitable fashion to a drive shaft of electric motor 26. A connection between actuation device 28 and electric motor 26 can be accomplished via a linkage. Front panel 20 can be closed and opened via electric motor 26, for which purpose front panel 20 pivots, for example, in a space configured inside dashboard 16. In a further exemplary embodiment it is also possible for front panel 20 to be displaced laterally.

Electric motor 26 is activated via a control unit 30 that can be acted upon by a control signal 32 of an immobilizer 34. Immobilizer 34 is a constituent of a control device (not depicted) of the motor vehicle and can be activated or deactivated, for example, via an ignition key of the motor vehicle.

Arrangement 10 functions as follows:

To enable the motor vehicle to be started, immobilizer 34 must be deactivated. This is done, for example, by introducing an ignition key into the ignition lock, whereby a transponder of the ignition key communicates with a corresponding control circuit of immobilizer 34.

Deactivation of immobilizer 34 causes activation, via the control device of the motor vehicle, of an internal combustion engine of the motor vehicle so that it can be started. At the same time, control unit 30 is informed via control signal 32 that immobilizer 34 has been deactivated.

Control unit 30 thereupon activates electric motor 26 so that front panel 20 is opened via actuation device 28, and car radio 12 is accessible.

When the vehicle is shut off, immobilizer 34 is activated by, for example, pulling the ignition key out of the ignition lock of the motor vehicle, so that control circuits of the internal combustion engine are inhibited (electronic drive lock). At the same time, control unit 30 is acted upon by a control signal 32 which signals that immobilizer 34 has been activated. Electric motor 26 is thereupon activated by control unit 30, and front panel 20 is closed via actuation device 28. Car radio 12 is thus securely arranged in housing 14 that is enclosed by front panel 20. Further control signals can be used to ensure that car radio 12 is simultaneously switched off as front panel 20 is closed.

The overall result is to make possible secure storage of car radio 12 in the motor vehicle. Because front panel 20 opens and closes automatically, there is no need for a motor vehicle driver to influence this operation. Deactivation of immobilizer 34 simultaneously makes car radio 12 accessible, while activation of immobilizer 34 secures car radio 12. Theft protection for car radio 12 is now guaranteed simply by the stability of housing 14, in particular of front panel 20. When front panel 20, which ideally fits flush with dashboard 16, is closed, car radio 12 is optimally shielded from view and protected from theft.

What is claimed is:

1. An arrangement for providing theft protection for a motor vehicle accessory having a codable theft protection device, comprising:

an enclosing device, the enclosing device being at least one of activated and deactivated via an immobilizer of a control system of a drive mechanism of the motor vehicle, wherein the immobilizer is part of a drive lock system.

2. The arrangement according to claim 1, wherein the enclosing device includes a housing to receive the motor vehicle accessory, and at least one closure device actuable via the immobilizer.

3. The arrangement according to claim 2, wherein the closure device is automatically actuable.

4. The arrangement according to claim 2, wherein the closure device is actuable via an electric motor, the electric motor being activatable via the immobilizer.

5. The arrangement according to claim 4, wherein the closure device includes a front panel of the housing, the housing being immovably recessed into a dashboard of the motor vehicle.

6. The arrangement according to claim 5, wherein the front panel is articulated retractably into the housing.

7. The arrangement according to claim 5, wherein the front panel is articulated retractably into the dashboard of the motor vehicle.

8. The arrangement according to claim 5, wherein the motor vehicle accessory includes a car radio.

9. The arrangement according to claim 5, wherein the motor vehicle accessory includes a navigation device.

10. The arrangement according to claim 5, wherein the motor vehicle accessory includes an audio system.

11. The arrangement according to claim 10, wherein the motor vehicle accessory includes a cassette system.

12. The arrangement according to claim 10, wherein the motor vehicle accessory includes a CD system.

13. The arrangement according to claim 2, wherein the closure device includes a front panel of the housing, the housing being immovably recessed into a dashboard of the motor vehicle.

14. The arrangement according to claim 13, wherein the front panel is articulated retractably into the housing.

15. The arrangement according to claim 13, wherein the front panel is articulated retractably into the dashboard of the motor vehicle.

16. The arrangement according to claim 1, wherein a transponder of an ignition key communicates with a control circuit of the immobilizer to at least one of activate and deactivate the immobilizer.

* * * * *